United States Patent
Daugherty et al.

(10) Patent No.: US 11,981,372 B2
(45) Date of Patent: May 14, 2024

(54) ELECTRICAL CONNECTOR FOR A VEHICLE

(71) Applicant: Ford Global Technologies, LLC, Dearborn, MI (US)

(72) Inventors: Keith Daugherty, Redford, MI (US); Christopher John Mazur, Canton, MI (US); William J. Kistler, Detroit, MI (US); Christopher Holland, Dearborn, MI (US); Miguel A. Garrido, Ypsilanti, MI (US); Gabriela De Jesus Grajales, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 17/333,693

(22) Filed: May 28, 2021

(65) Prior Publication Data
US 2022/0379976 A1    Dec. 1, 2022

(51) Int. Cl.
| | |
|---|---|
| *B60Q 9/00* | (2006.01) |
| *B60R 7/08* | (2006.01) |
| *B60R 16/04* | (2006.01) |
| *B62D 33/02* | (2006.01) |

(52) U.S. Cl.
CPC ............ *B62D 33/02* (2013.01); *B60Q 9/00* (2013.01); *B60R 7/08* (2013.01); *B60R 16/04* (2013.01)

(58) Field of Classification Search
CPC ...... B62D 33/02; B62D 25/24; B62D 33/023; B60Q 9/00; B60R 7/08; B60R 16/04; B60R 7/02; H01R 2201/26
USPC ...................................................... 439/34, 36
See application file for complete search history.

(56) References Cited

U.S. PATENT DOCUMENTS

| | | | | |
|---|---|---|---|---|
| 4,862,011 | A * | 8/1989 | Wright | B60R 16/027 174/72 A |
| 9,093,773 | B2 * | 7/2015 | Pietila | B60L 1/006 |
| 9,233,619 | B2 * | 1/2016 | Ono | B60L 53/16 |
| 9,438,051 | B2 * | 9/2016 | Firman, II | H01R 31/065 |
| 10,093,248 | B2 * | 10/2018 | Xu | B60R 16/0215 |
| 10,352,978 | B2 * | 7/2019 | Johnson | G01R 31/007 |
| 11,242,097 | B1 * | 2/2022 | Gross, IV | H04R 5/02 |
| 11,590,852 | B2 * | 2/2023 | Hitchcock | H01R 13/5213 |
| 2004/0130902 | A1 * | 7/2004 | Snyder | B60Q 3/30 362/540 |
| 2014/0081490 | A1 * | 3/2014 | Adelman | B60L 53/16 320/109 |
| 2022/0242291 | A1 * | 8/2022 | Inagaki | B60N 2/90 |
| 2022/0314825 | A1 * | 10/2022 | Liu | B60K 15/04 |

* cited by examiner

*Primary Examiner* — Amy R Weisberg
*Assistant Examiner* — Sara Laghlam
(74) *Attorney, Agent, or Firm* — Frank Lollo; Price Heneveld LLP

(57) ABSTRACT

A vehicle includes a panel that defines an aperture. The vehicle also includes a cover operably coupled to the panel. The cover is operable between a first condition and a second condition. In the first condition, the cover conceals the aperture. In the second condition, access to the aperture is provided. The vehicle further includes an electrical connector coupled to the cover, such that the electrical connector moves with the cover as the cover moves between the first and second conditions. Movement of the cover from the first condition to the second condition reveals the electrical connector.

20 Claims, 12 Drawing Sheets

# ELECTRICAL CONNECTOR FOR A VEHICLE

FIELD OF THE DISCLOSURE

The present disclosure generally relates to an electrical connector for a vehicle. More specifically, the present disclosure relates to an electrical connector for a vehicle that is disposed in and removable from an aperture defined by a panel of the vehicle.

BACKGROUND OF THE DISCLOSURE

Auxiliary electrical devices can be coupled to vehicles.

SUMMARY OF THE DISCLOSURE

According to a first aspect of the present disclosure, a vehicle includes a panel that defines an aperture. The vehicle also includes a cover operably coupled to the panel. The cover is operable between a first condition and a second condition. In the first condition, the cover conceals the aperture. In the second condition, access to the aperture is provided. The vehicle further includes a first electrical connector coupled to the cover, such that the first electrical connector moves with the cover as the cover moves between the first and second conditions. Movement of the cover from the first condition to the second condition reveals the first electrical connector.

Embodiments of the first aspect of the present disclosure can include any one or a combination of the following features:
- the first electrical connector is electrically coupled to a battery of the vehicle;
- a second electrical connector is coupled to the cover, such that the second electrical connector moves with the cover as the cover moves between the first and second conditions, and movement of the cover from the first condition to the second condition reveals the second electrical connector;
- the second electrical connector is not electrically connected to the battery of the vehicle;
- the first electrical connector is configured for mating engagement with the second electrical connector;
- the panel is at least a portion of a D-pillar of a cargo bed of the vehicle;
- a storage locker is positioned proximate to the D-pillar and includes a body that includes an interior side that defines a storage space and an exterior side opposite the interior side, wherein the storage space is accessible via an opening defined by the body, and wherein the body includes an access indicator in a spaced relationship with the opening;
- the access indicator is positioned on the exterior side of the body;
- the access indicator is disposed at a position of the body, such that the access indicator is aligned in a vehicle-horizontal direction with the aperture defined by the D-pillar;
- the access indicator is integrally coupled with the body;
- the access indicator is removably coupled with the body, and removal of the access indicator from the body reveals an access point defined by the body; and
- the first electrical connector is a 12-volt electrical connector.

According to a second aspect of the present disclosure, a vehicle includes a cargo bed having a pillar that defines an aperture. The cargo bed defines a cargo area. The vehicle also includes a cover operably coupled to the pillar and operable between a first condition and a second condition. In the first condition, the cover conceals the aperture. In the second condition, access to the aperture is provided. The vehicle also includes a first electrical connector proximate to the pillar. Movement of the cover from the first condition to the second condition reveals the first electrical connector. Further, the vehicle includes a storage locker positioned proximate to the pillar and having a body that includes an interior side that defines a storage space and an exterior side opposite the interior side. The storage space is accessible via an opening defined by the body. The body includes an access indicator in a spaced relationship with the opening.

Embodiments of the second aspect of the present disclosure can include any one or a combination of the following features:
- the access indicator protrudes outward from the exterior side of the body;
- the access indicator is disposed at a position of the body, such that the access indicator is aligned in a vehicle-horizontal direction with the aperture defined by the pillar;
- the opening defined by the body faces the cargo area defined by the cargo bed;
- the first electrical connector is coupled to the cover, such that the first electrical connector moves with the cover as the cover moves between the first and second conditions;
- a second electrical connector is coupled to the cover, such that the second electrical connector moves with the cover as the cover moves between the first and second conditions, and movement of the cover from the first condition to the second condition reveals the second electrical connector; and
- the first electrical connector is configured for mating engagement with the second electrical connector.

According to a third aspect of the present disclosure, a vehicle includes a panel defining an aperture. The vehicle also includes a cover operably coupled to the panel and operable between a first condition and a second condition. In the first condition, the cover conceals the aperture. In the second condition, access to the aperture is provided. Further, the vehicle includes an electrical connector removably coupled to the cover.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description that follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
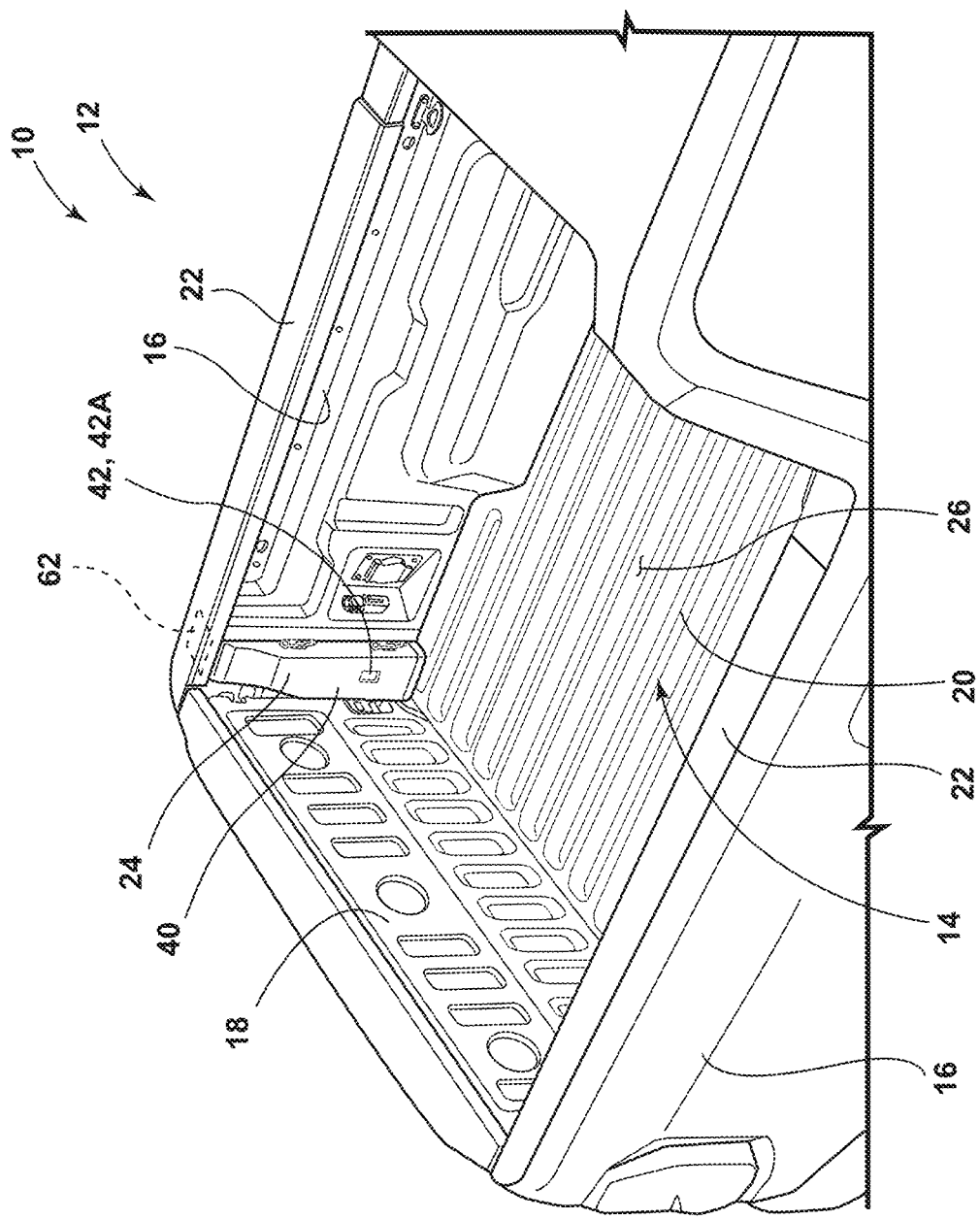
FIG. 1 is a top perspective view of a cargo bed of a vehicle, according to one embodiment.

Referring now to FIGS. 1-12, a vehicle 10 is disclosed. In the embodiment depicted in FIG. 1, the vehicle 10 is a pick-up truck 12. The pick-up truck 12 includes an open cargo bed 14 at the rear portion of the vehicle 10. The cargo bed 14 is defined by upright side walls 16 and a rear tailgate 18 that is pivotally supported between the side walls 16 for movement between an upright, generally vertical, closed position, as is depicted in FIG. 1, and a lowered, generally horizontal, open position (not shown). The cargo bed 14 is also provided with a floor 20 that extends generally horizontally between the side walls 16. When the tailgate 18 is in the lowered, generally horizontal, open position, the top surface of the tailgate 18 is essentially an extension of the floor 20. The cargo bed 14 is also formed with a top rail 22 that is the upper terminus of each of the side walls 16. The top rail 22 is formed as a generally horizontal extension of the side wall 16 and projects slightly inwardly from the side wall 16. A frame of the pick-up truck 12 includes a pair of opposing upright tubular pillars 24 that are commonly referred to as D-pillars 24, which are located at the rearward-most part of the cargo bed 14 adjacent the respective side walls 16. The frame of the vehicle 10 may include a plurality of pillars 24 other than D-pillars 24, in various embodiments. As illustrated in FIG. 1, the cargo bed 14 generally defines a cargo area 26.

Figure 9:
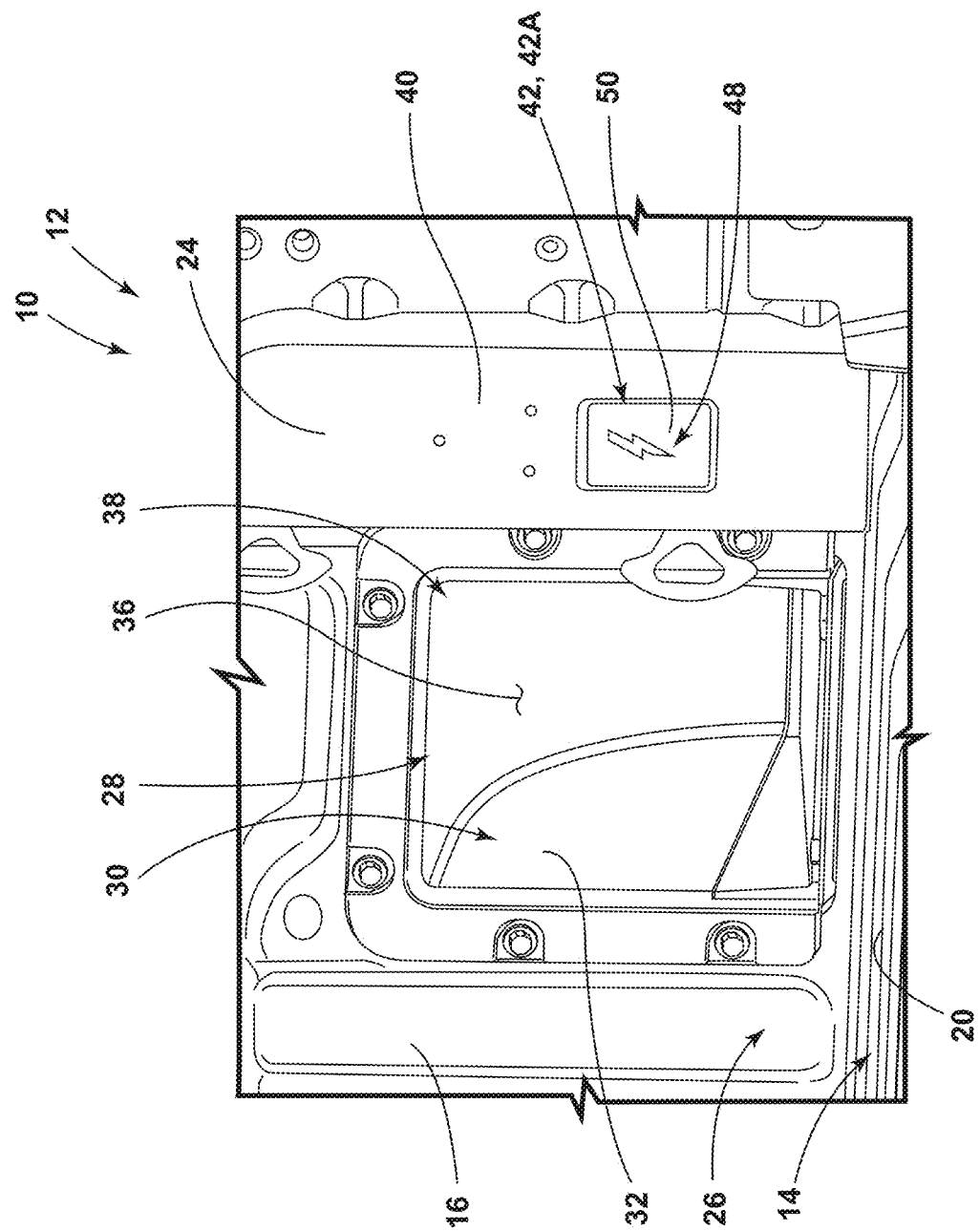
FIG. 9 is a side perspective view of a portion of the cargo bed of the vehicle, illustrating a storage locker in a use position and the cover covering an aperture defined by the D-pillar, according to one embodiment.
Figure 10:
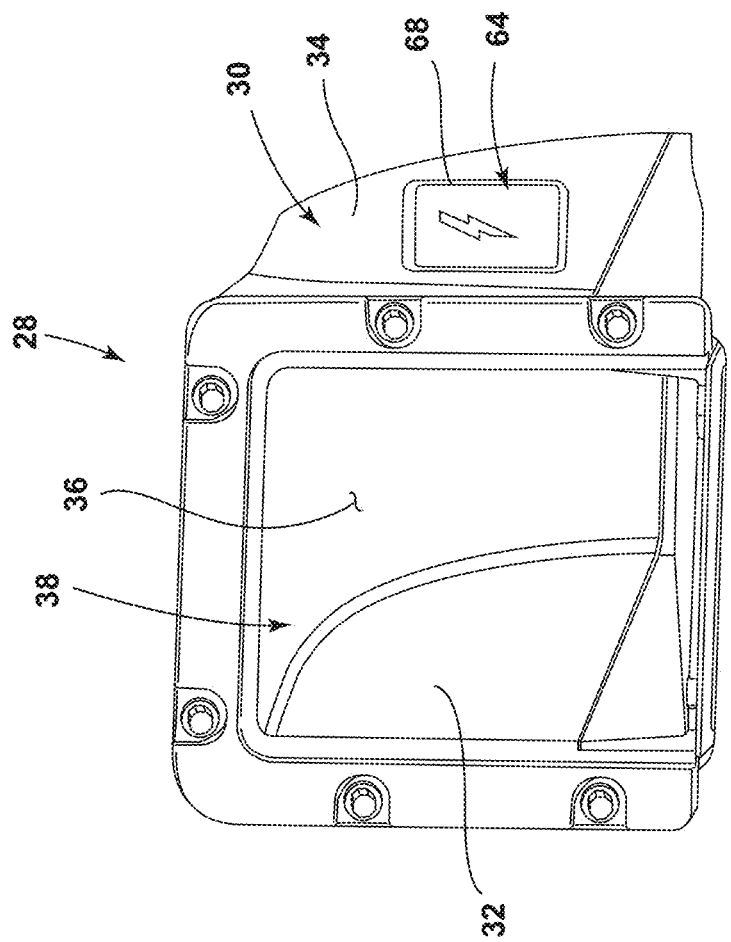
FIG. 10 is an upper perspective view of the storage locker, illustrating an access indicator positioned on an exterior side of a body of the storage locker, according to one embodiment.
Figure 11:
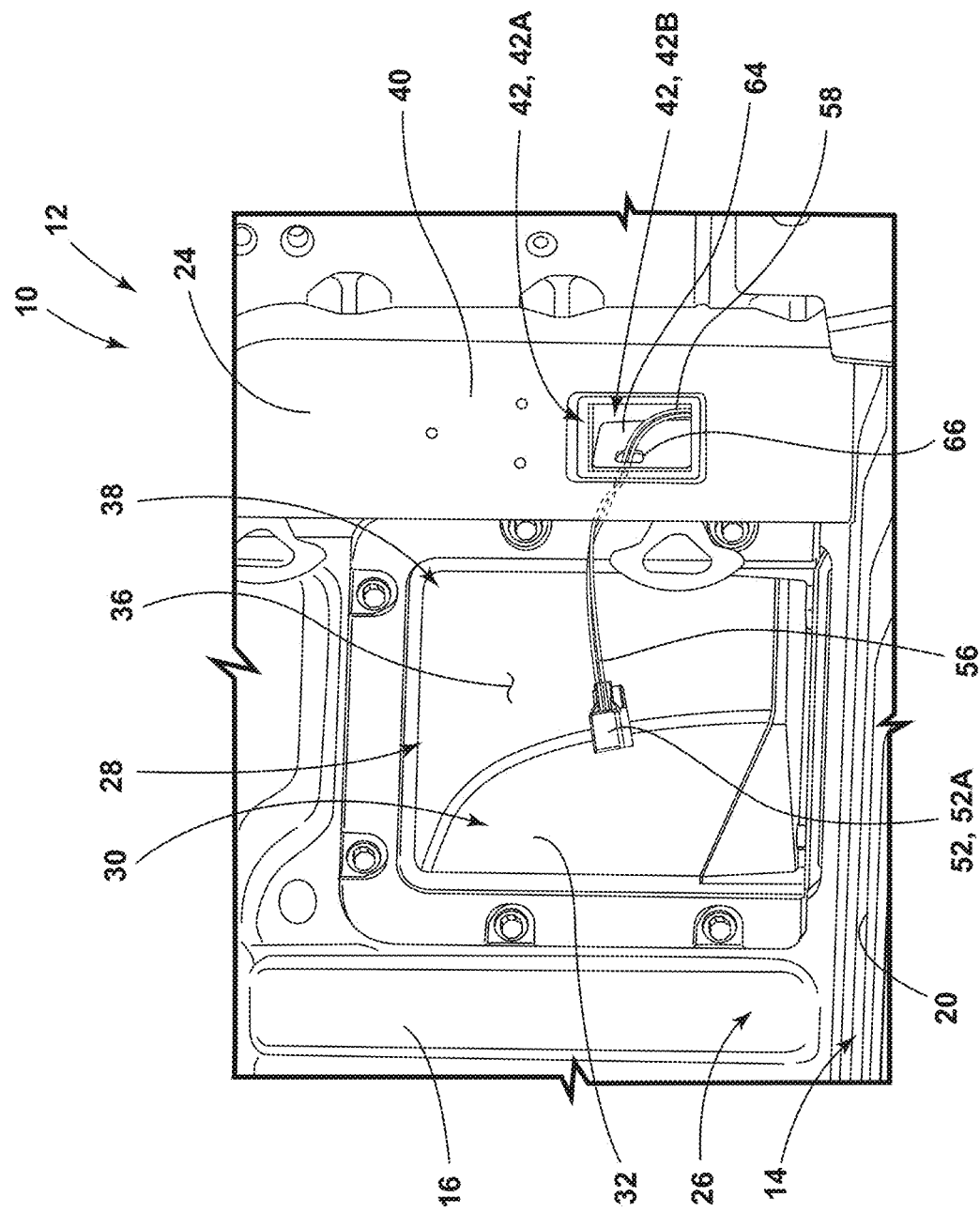
FIG. 11 is a side perspective view of a portion of the cargo bed of the vehicle, illustrating the electrical connector positioned within a storage space defined by an interior side of the body of the storage locker, and power and ground wires extending outward from the electrical connector through an access point defined by the body of the storage locker, and through an aperture defined by the D-pillar of the vehicle, according to one embodiment.

Referring now to FIGS. 9-11, in some embodiments, the vehicle 10 may include a storage locker 28. The storage locker 28 may be coupled to the cargo bed 14. In some embodiments, the storage locker 28 may be positioned proximate to one of the D-pillars 24 of the vehicle 10. For example, as illustrated in FIG. 9, the storage locker 28 is positioned adjacent to the D-pillar 24 extending upward along the right side of the cargo bed 14. The storage locker 28 may include a body 30. The body 30 may include an interior side 32 and an exterior side 34 opposite the interior side 32. The interior side 32 may define a storage space 36 for storing items. In various embodiments, the storage space 36 is accessible via an opening 38 defined by the body 30. As illustrated in FIG. 9, in some implementations, the opening 38 defined by the body 30 faces the cargo area 26 defined by the cargo bed 14. It is contemplated that the opening 38 may face at least one of a variety of vehicle directions (e.g., vehicle-upward, vehicle-outboard, etc.) in various embodiments. Further, although the storage locker 28 is depicted without a door in FIGS. 9-11, in various embodiments, a door may be operably coupled to the storage locker 28 and movable between an open condition, wherein access to the storage space 36 is provided, and a closed condition, wherein the door generally covers the opening 38 defined by the body 30.

Referring again to FIGS. 1-11, the vehicle 10 includes a panel 40 that defines an aperture 42. It is contemplated that the panel 40 may be at least one of a host of interior and/or exterior components of the vehicle 10. In some examples, the panel 40 may be a portion of the cargo bed 14. For example, the panel 40 may be at least one of the side walls 16 of the cargo bed 14. In some embodiments, the panel 40 may be at least a portion of a pillar 24 of the vehicle 10, such as the D-pillar 24 of the vehicle 10. For example, as illustrated in FIG. 1, the D-pillar 24 is the panel 40 and defines the aperture 42. In the illustrated embodiment, the floor 20 of the cargo bed 14 is nearer than the top rail 22 to the aperture 42 defined by the D-pillar 24. In other words, the aperture 42 is defined by the bottom half of the portion of the D-pillar 24 extending between the floor 20 of the cargo bed 14 and the top rail 22. The aperture 42 defined by the D-pillar 24 provides access to a hollow 44 defined by an interior surface 46 of the D-pillar 24. In the embodiment illustrated in FIG. 1, the aperture 42 is defined by a side of the D-pillar 24 that faces into the cargo area 26 defined by the cargo bed 14.

Figure 2:
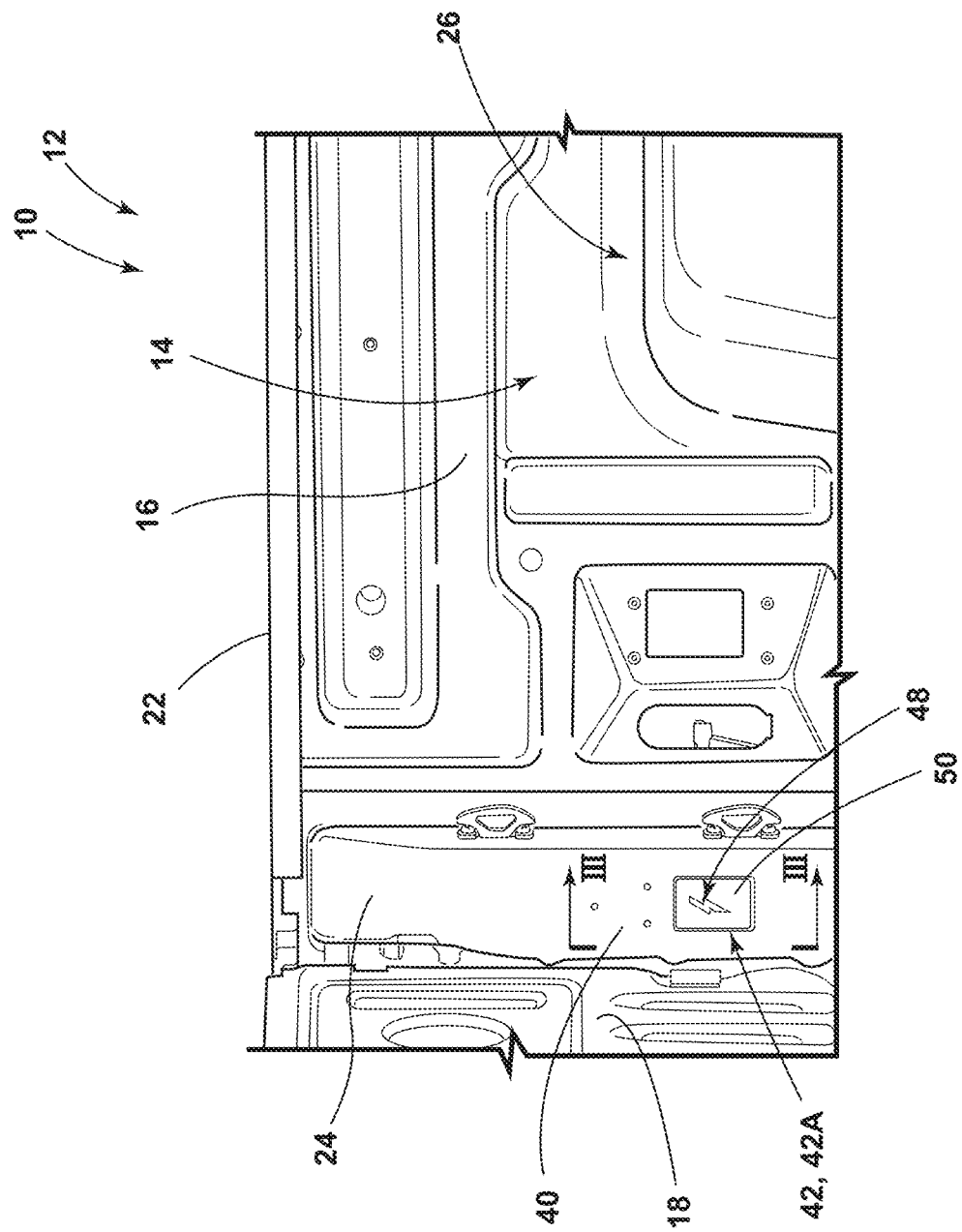
FIG. 2 is a side perspective view of a portion of the cargo bed of the vehicle, illustrating a D-pillar that defines an aperture and a cover covering the aperture in a first condition, according to one embodiment.
Figure 3:
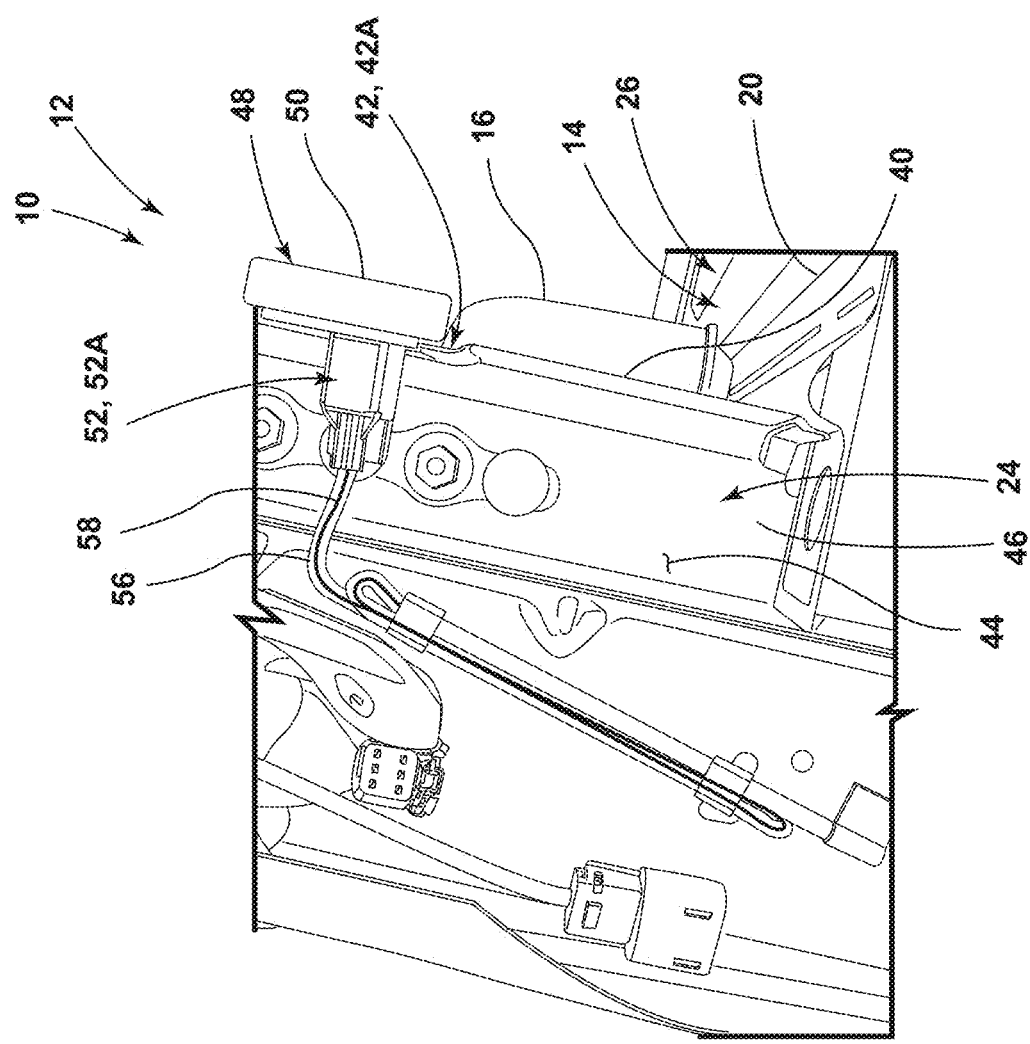
FIG. 3 is a cross-sectional view of the D-pillar taken through line III-III of FIG. 2, illustrating an electrical connector coupled to the cover and power and ground wires extending outward from the electrical connector into a hollow defined by an interior surface of the D-pillar, according to one embodiment.
Figure 4:
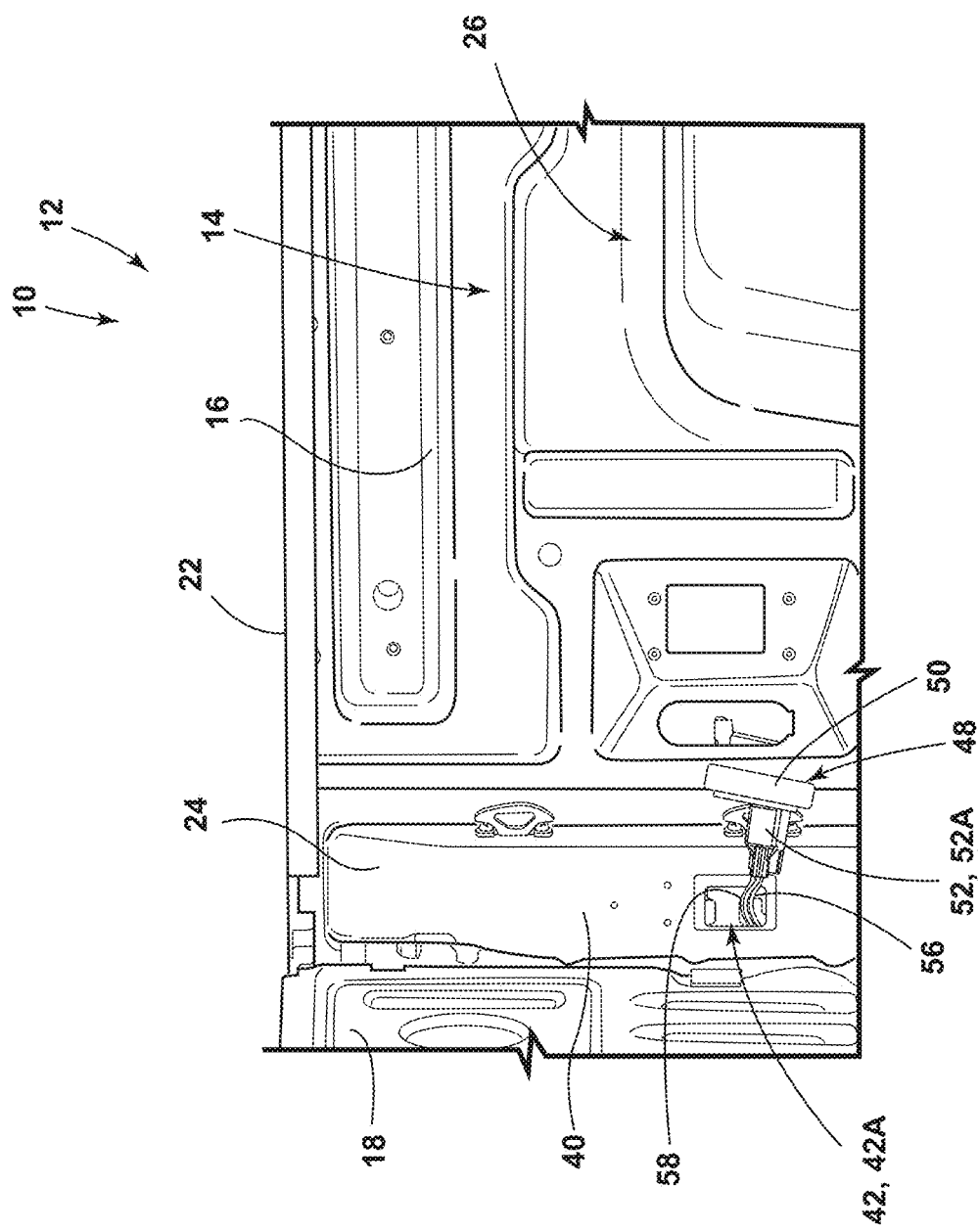
FIG. 4 is a side perspective view of a portion of the cargo bed of the vehicle, illustrating the cover in a second condition and the electrical connector coupled to the cover, according to one embodiment.

Referring now to FIGS. 2 and 3, a cover 48 may be operably coupled to the panel 40 of the vehicle 10 and operable between a first condition, wherein the cover 48 conceals the aperture 42, and a second condition, wherein the access to the aperture 42 is provided. It is contemplated that the cover 48 may transition between the first and second conditions in a variety of manners, in various embodiments. For example, in some embodiments, the cover 48 may be pivotably coupled to the panel 40 and configured to pivot between the first and second conditions. In the embodiment illustrated in FIGS. 2-4, wherein the D-pillar 24 is the panel 40 that defines the aperture 42, the cover 48 is a plug 50 that is removably coupled to the D-pillar 24. The plug 50 is operable between the first condition, wherein the plug 50 is inserted into the aperture 42 defined by the D-pillar 24, such that the aperture 42 is covered by the plug 50, as illustrated in FIGS. 2 and 3, and the second condition, wherein the plug 50 is removed from the aperture 42, such that access is provided to the aperture 42, as illustrated in FIG. 4. In the illustrated embodiment, the plug 50 is yieldingly retained in the first condition via friction between the plug 50 and the D-pillar 24. A variety of features for selectively maintaining the cover 48 in the first condition are contemplated.

Figure 12:
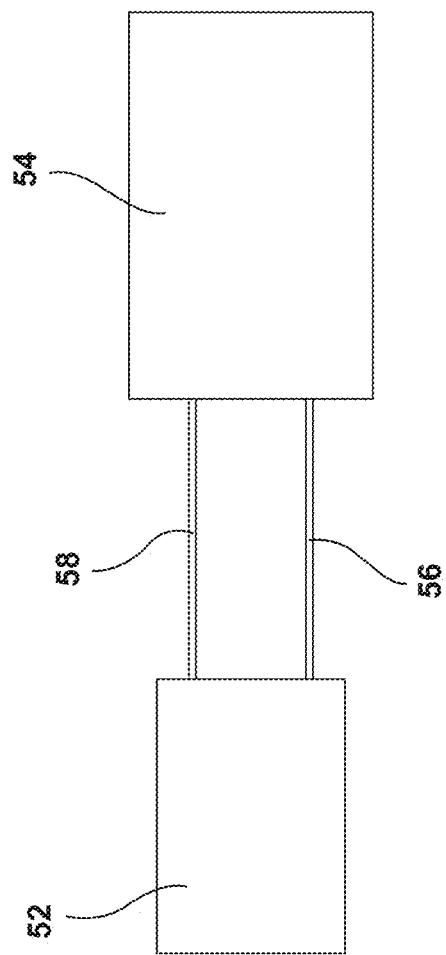
FIG. 12 is a schematic diagram, illustrating the ground and power wires extending between a battery of the vehicle and the electrical connector.

Referring now to FIGS. 2-4 and 12, in various embodiments, the vehicle 10 includes an electrical connector 52. The electrical connector 52 may be coupled to a power source such as a battery 54 of the vehicle 10. The electrical connector 52 may include ground and power wires 56, 58 and may be connected to the battery 54, directly or indirectly, thereby, as illustrated schematically in FIG. 12. A variety of intermediate components not illustrated in FIG. 12 are contemplated (e.g., fuses, switches, body of the vehicle 10 to which the ground wire 56 is grounded, etc.). For example, in an exemplary embodiment, the electrical connector 52 is an electromechanical interface that accommodates two circuits that are electrically coupled to a fuse, which is energized by the battery 54 relay. In some embodiments, the vehicle 10 may include a plurality of electrical connectors 52. For example, the vehicle 10 may include a first electrical connector 52A that may be configured for engagement with a corresponding second electrical connector 52B. Engagement of the first electrical connector 52A with the corresponding second electrical connector 52B may allow current to flow across the engaged first and second electrical connectors 52A, 52B. In some implementations, the electrical connector 52 may be a 12-volt electrical connector 52. Electrical connectors 52 for various voltages are contemplated.

Referring still to FIGS. 2-4, in some embodiments, the electrical connector 52 may be positioned, such that movement of the cover 48 from the first condition to the second condition reveals the electrical connector 52. In some implementations, the electrical connector 52 may be coupled to the cover 48, such that the electrical connector 52 moves with the cover 48 as the cover 48 moves between the first and second conditions. As such, the electrical connector 52 coupled to the cover 48 may be revealed due to the movement of the cover 48 from the first condition to the second condition. In the embodiment illustrated in FIGS. 2-4, wherein the D-pillar 24 is the panel 40 that defines the aperture 42 and the plug 50 is the cover 48, the electrical connector 52 is coupled to the plug 50, such that the electrical connector 52 is disposed within the hollow 44 defined by the D-pillar 24 and is concealed by the plug 50 while the plug 50 is in the first condition, as illustrated in FIGS. 2 and 3. Movement of the plug 50 from the first condition to the second condition causes the attached electrical connector 52 to move with the plug 50, such that the electrical connector 52 travels through the aperture 42 and into the cargo area 26 defined by the cargo bed 14 outside of the D-pillar 24, as illustrated in FIG. 4.

Figure 5:
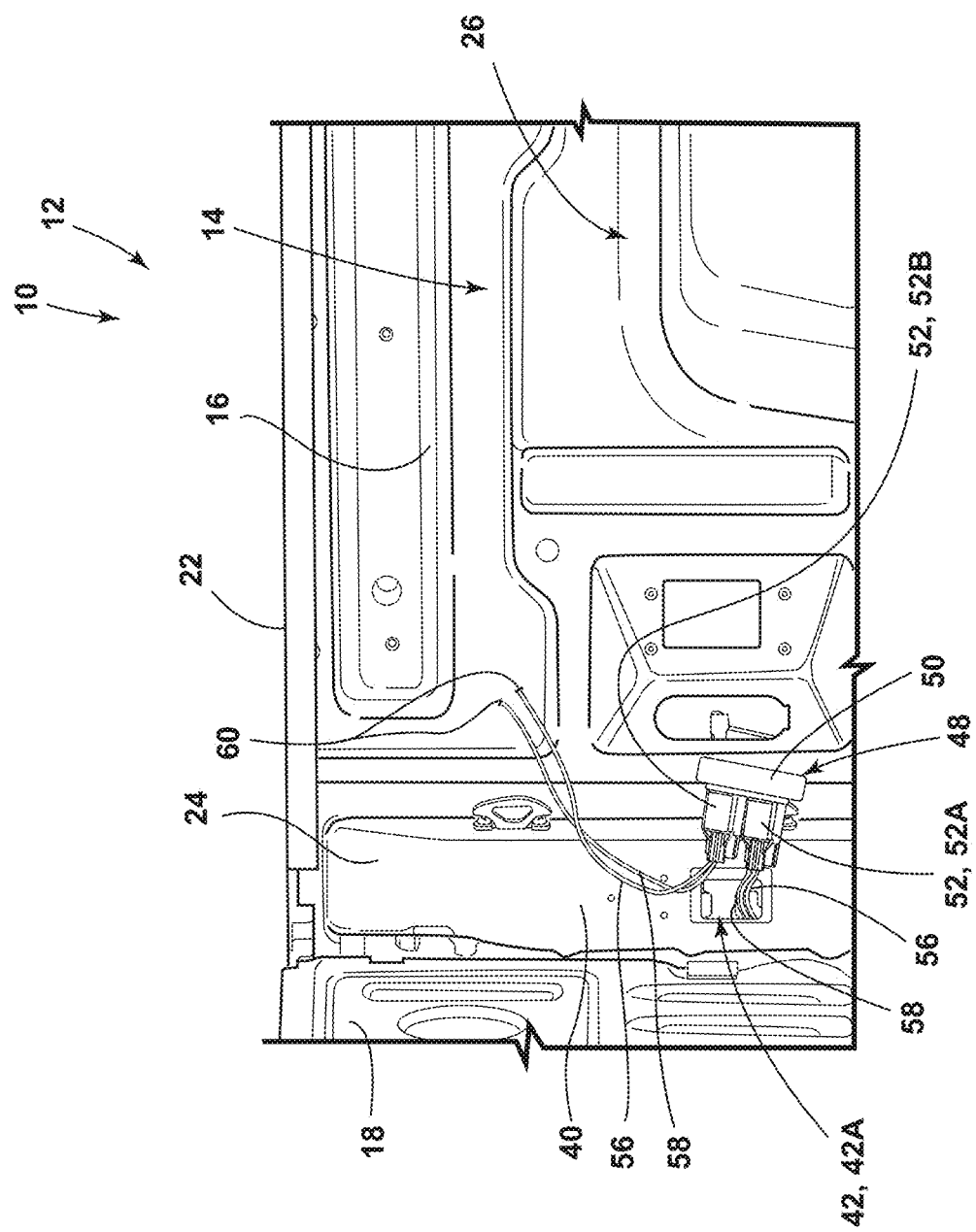
FIG. 5 is a side perspective view of the cargo bed of the vehicle, illustrating the cover in the second position and first and second electrical connectors coupled to the cover in attached conditions, according to one embodiment.

Referring now to FIG. 5, in some embodiments, first and second electrical connectors 52A, 52B may be positioned, such that movement of the cover 48 from the first condition to the second condition reveals the first and second electrical connectors 52A, 52B. In some implementations, the first and/or second electrical connectors 52A, 52B may be coupled to the cover 48, such that the first and/or second electrical connectors 52A, 52B move with the cover 48 as the cover 48 moves between the first and second conditions. The first and second electrical connectors 52A, 52B coupled to the cover 48 may be revealed due to the movement of the cover 48 from the first condition to the second condition. In the embodiment illustrated in FIG. 5, wherein the D-pillar 24 is the panel 40 that defines the aperture 42 and the plug 50 is the cover 48, the first and second electrical connectors 52A, 52B are coupled to the plug 50, such that the first and second electrical connectors 52A, 52B are disposed within the hollow 44 defined by the D-pillar 24 and are concealed by the plug 50 while the plug 50 is in the first condition. Movement of the plug 50 from the first condition to the second condition causes the attached first and second electrical connectors 52A, 52B to move with the plug 50, such that the first and second electrical connectors 52A, 52B travel through the aperture 42 and into the cargo area 26 defined by the cargo bed 14 outside of the D-pillar 24, as illustrated in FIG. 5.

Figure 6:
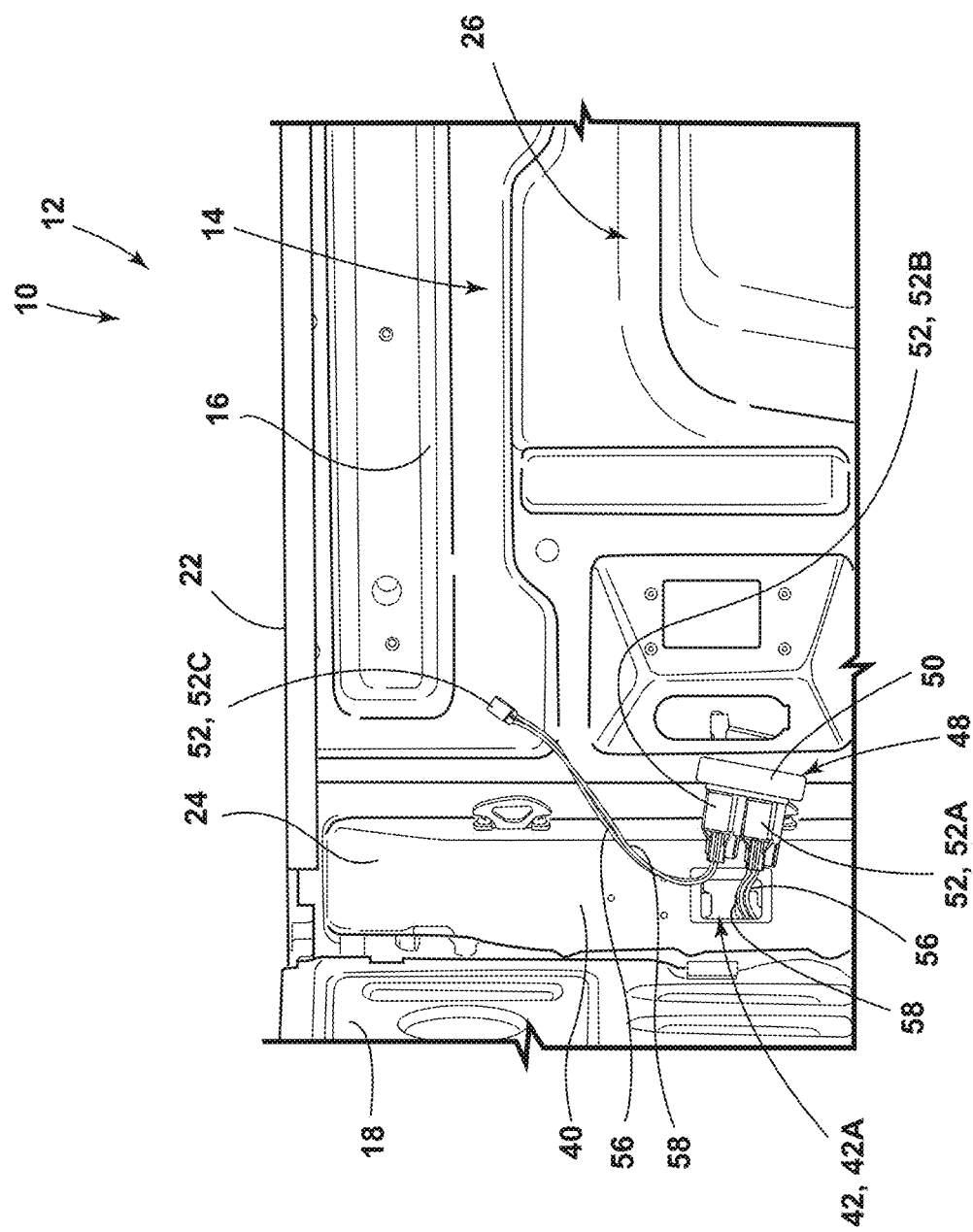
FIG. 6 is a side perspective view of a portion of the cargo bed of the vehicle, illustrating the cover in the second condition, the first and second electrical connectors in the attached conditions, and a third connector coupled to the ground and power wires extending out of the second electrical connector, according to one embodiment.
Figure 7:
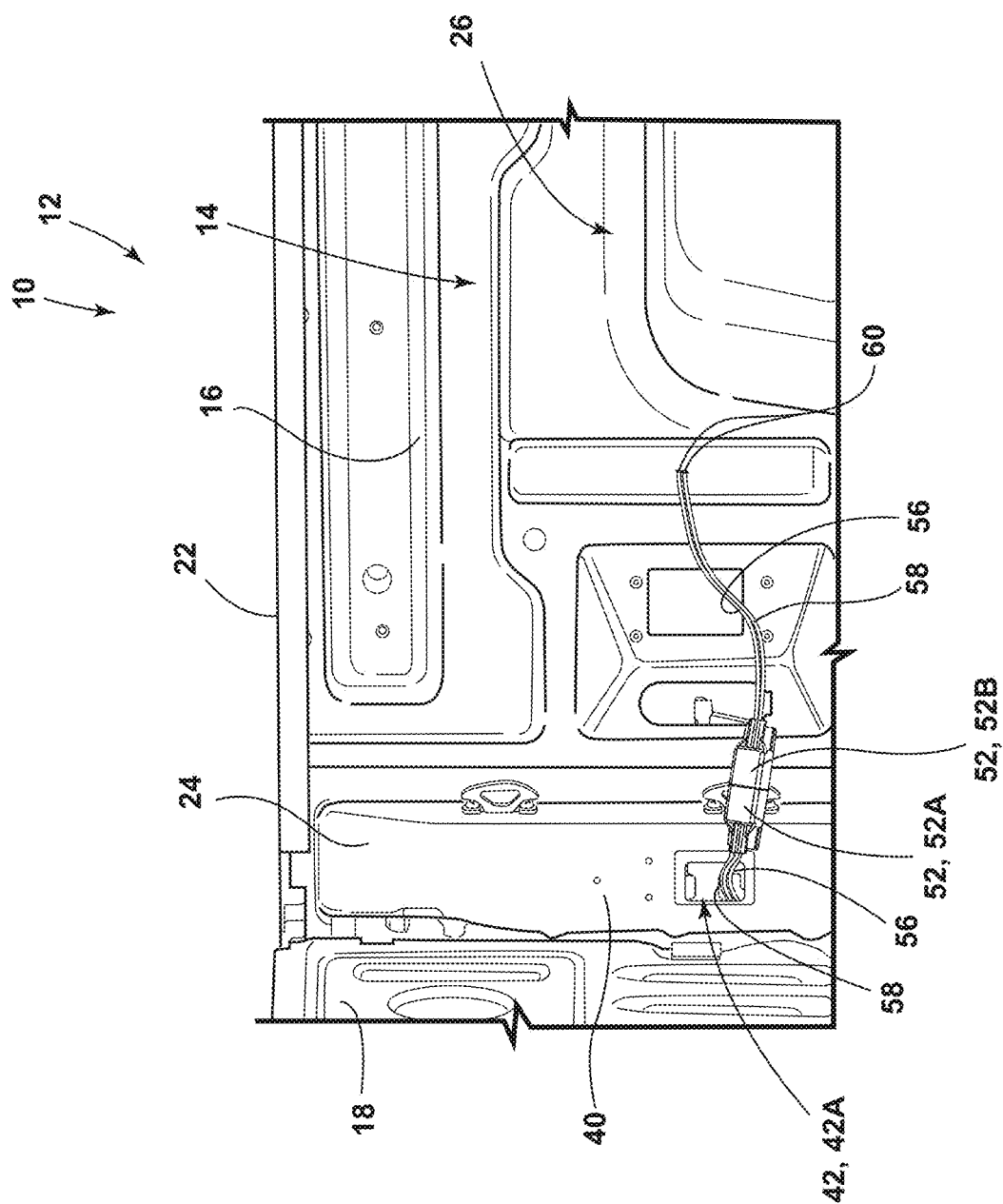
FIG. 7 is a side perspective view of a portion of the cargo bed of the vehicle, illustrating the first and second electrical connectors engaged with each other, according to one embodiment.

Referring now to FIGS. 4-7, the electrical connector 52 may be removably coupled to the cover 48. In various embodiments, the electrical connector 52 may be operable between an attached condition, wherein the electrical connector 52 is attached to the cover 48, and a detached condition, wherein the electrical connector 52 is detached from the cover 48. A variety of features operable to selectively couple the electrical connector 52 to the cover 48 are contemplated (e.g., snap-fit feature, hook and loop fastener, mating engagement feature, etc.). In some embodiments, the first and second electrical connectors 52A, 52B may be removably coupled to the cover 48 and operable between the attached and detached conditions. For example, in the embodiment illustrated in FIGS. 5 and 7, wherein the D-pillar 24 is the panel 40 that defines the aperture 42 and the plug 50 is the cover 48, the first and second electrical connectors 52A, 52B are removably coupled to the plug 50. The first and second electrical connectors 52A, 52B are operable between the attached condition, wherein the first and second electrical connectors 52A, 52B are attached to the plug 50, as illustrated in FIG. 5, and the detached condition, wherein the first and second electrical connectors 52A, 52B are detached from the plug 50, as illustrated in FIG. 7. In some embodiments, the first electrical connector 52A may be electrically coupled to the battery 54 in the attached condition, and the second electrical connector 52B is not electrically coupled to the battery 54 in the attached condition.

Referring to FIGS. 5-7, the first and second electrical connectors 52A, 52B may be corresponding electrical connectors 52 that are configured for engagement with each other. For example, the first electrical connector 52A may be a female electrical connector and the second electrical connector 52B may be a male electrical connector that is configured to matingly engage the female, first electrical connector 52A. In the embodiment illustrated in FIG. 7, the first electrical connector 52A is a female electrical connector that is matingly engaged by the male, second electrical connector 52B. In the embodiments illustrated in FIGS. 5 and 6, the first and second electrical connectors 52A, 52B are disengaged from each other while coupled to the plug 50 in the attached conditions. It is contemplated that, in some embodiments, the first and second electrical connectors 52A, 52B may be engaged with each other while coupled to the cover 48 in the attached condition.

Referring now to FIGS. 5 and 6, the second electrical connector 52B may include ground and power wires 56, 58. In some embodiments, the ground and power wires 56, 58 coupled to the electrical connector 52 may extend from the second electrical connector 52B to a third electrical connector 52C. For example, as illustrated in FIG. 6, the power and ground wires 58, 56 extend from the male, second electrical connector 52B to a female, third electrical connector 52C. The third electrical connector 52C may be configured for engagement with a fourth electrical connector (not shown) that is coupled to an auxiliary electrical device. In operation, the second electrical connector 52B may be engaged with the first electrical connector 52A, which is connected with the battery 54 of the vehicle 10, and the third electrical connector 52C may be coupled with the fourth electrical connector of the electrical device, such that the electrical device is powered by the battery 54. In such embodiments, the second electrical connector 52B, the third electrical connector 52C, and the power and ground wires 58, 56 extending therebetween may act as an extension cord that expands the area that the electrical device can be connected to power, as described further herein.

Referring still to FIGS. 5 and 6, in some embodiments, the ground and power wires 56, 58 that extend outward from the second electrical connector 52B may not be coupled with a third electrical connector 52C. For example, as illustrated in FIG. 5, the ground and power wires 56, 58 that extend out of the second electrical connector 52B do not extend to a third electrical connector 52C, but rather terminate distally from the second electrical connector 52B at terminal ends 60. In such embodiments, the power and ground wires 58, 56 may be suitable for splicing with corresponding power and ground wires 58, 56 of an electrical device to provide power to the electrical device.

Referring now to FIGS. 3 and 4, in various embodiments, the ground and power wires 56, 58 that extend outward from the electrical connector 52 and are connected, directly or indirectly, to the battery 54 of the vehicle 10 may have lengths that allow the attached first electrical connector 52A to travel out of the aperture 42 and into the cargo area 26 a given distance without the ground and power wires 56, 58 being disconnected from the battery 54. In other words, in the attached condition of the electrical connector 52, wherein the electrical connector 52 is attached to the cover 48, and the first condition of the cover 48, wherein the cover 48 generally covers the apertures 42 defined by the panel 40, there may be slack in the power and ground wires 58, 56 that allows the electrical connector 52 to travel with the cover 48 as the cover 48 moves to the second condition. The slack in the power and ground wires 58, 56 may allow the electrical connector 52 to move a given distance until the power wire 58 and/or the ground wire 56 is taut.

In some embodiments, the length of the ground wire 56 and/or the power wire 58 coupled to the electrical connector 52 may be such that, when the electrical connector 52 is pulled away from the aperture 42 and the ground wire 56 and/or power wire 58 is taut, the portion of the taut ground wire 56 and/or taut power wire 58 that extends from the aperture 42 to the electrical connector 52 has a length that is greater than or equal to about 6 inches. In some embodiments, the length of the portion of the taut ground wire 56 and/or taut power wire 58 that extends from the aperture 42 to the electrical connector 52 is greater than or equal to about 12 inches. In some embodiments, the length of the portion of the taut ground wire 56 and/or the taut power wire 58 that extends from the aperture 42 to the electrical connector 52 is between about 6 inches and about 18 inches. In some embodiments, the length of the portion of the taut ground wire 56 and/or the taut power wire 58 that extends from the aperture 42 to the electrical connector 52 is between about 10 inches and about 14 inches.

Figure 8:
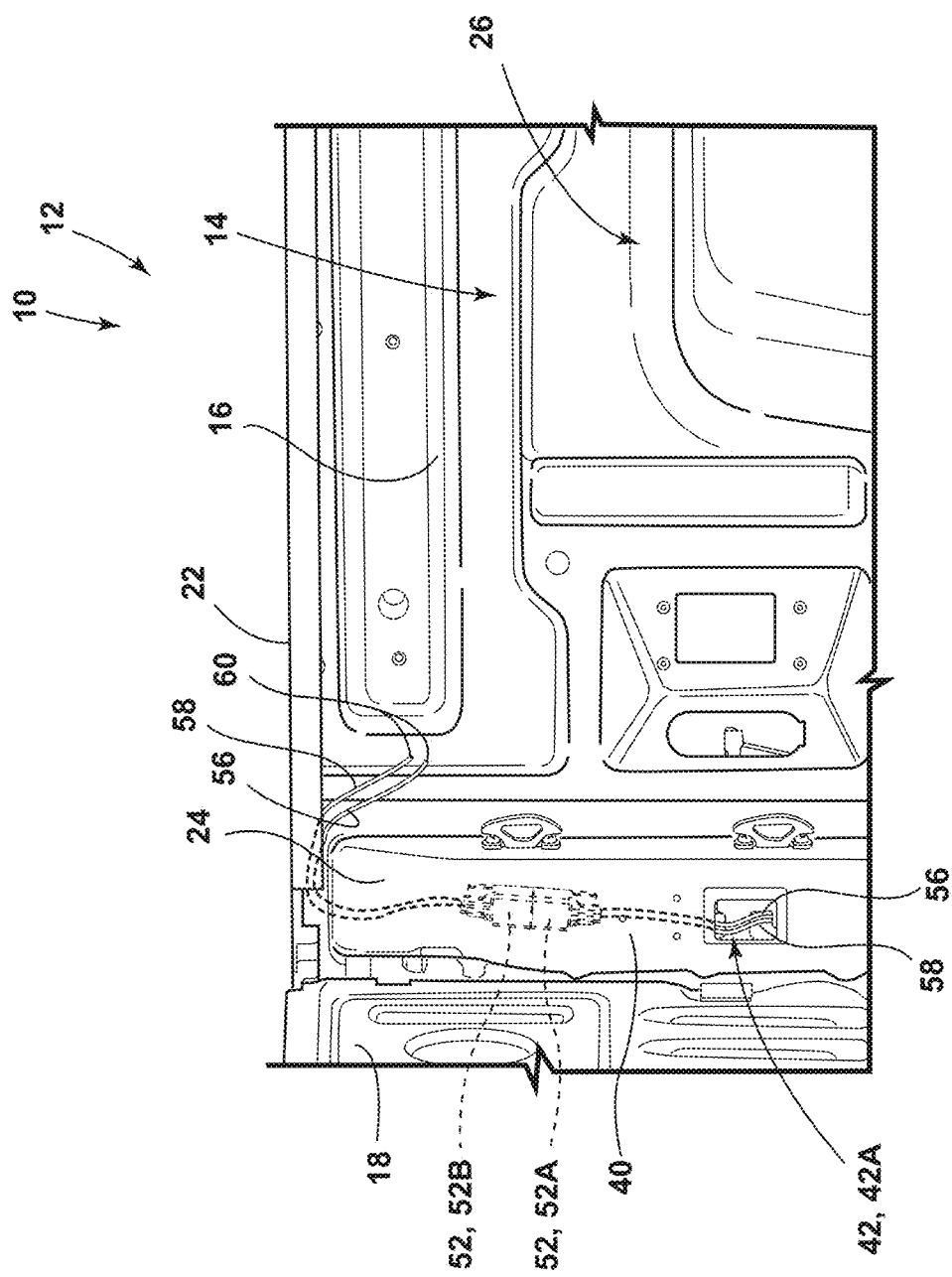
FIG. 8 is a side perspective view of a portion of the cargo bed of the vehicle, illustrating the first and second electrical connectors engaged with each other and disposed within the hollow defined by the interior surface of the D-pillar, and terminal ends of the ground and power wires extending outward from the second electrical connector extending out of an upper end of the D-pillar and into the cargo area defined by the cargo bed, according to one embodiment.

Referring now to FIGS. 1 and 5-8, in various embodiments, an upper end 62 of the D-pillar 24 of the vehicle 10 is open-ended, such that access to the hollow 44 defined by the interior surface 46 of the generally tubular D-pillar 24 is accessible via the open upper end 62. Further, as illustrated in FIG. 1, in various embodiments, the top rail 22 of the cargo bed 14 extends over at least a portion of the open upper end 62 of the D-pillar 24. In some embodiments, a gap (not shown) is defined between the upper end 62 of the D-pillar 24 and the top rail 22 that extends over the upper end 62 of the D-pillar 24. In some implementations, power and ground wires 58, 56 coupled to at least one electrical connector 52 may be configured to extend from within the hollow 44 defined by the D-pillar 24, through the gap defined between the upper end 62 of the D-pillar 24 and the top rail 22, and into the cargo area 26 defined by the cargo bed 14. For example, as illustrated in FIG. 8 the first and second electrical connectors 52A, 52B are engaged with each other and disposed within the hollow 44 defined by the interior of the D-pillar 24, and the power and ground wires 58, 56 extending outward from the second electrical connector 52B extend upward from the second electrical connector 52B to the open upper end 62 of the D-pillar 24. The power and ground wires 58, 56 extend out the open upper end 62, through the gap (not shown) defined between the D-pillar 24 and the top rail 22, and into the cargo area 26 defined by the cargo bed 14. In the embodiment illustrated in FIG. 8, the power and ground wires 58, 56 terminate distally from the second electrical connector 52B at respective terminal ends 60. The lack of the third electrical connector 52C at the terminal ends 60 of the power and ground wires 58, 56 may allow the power and ground wires 58, 56 to fit through the gap, which is prohibitively small for the third electrical connector 52C to fit through in some embodiments. It is contemplated that, in some embodiments, the gap and/or the third electrical connector 52C may be sized to allow the third electrical connector 52C to fit through the gap.

In operation of an exemplary embodiment of the vehicle 10, a user desires to install an auxiliary lighting device within the cargo bed 14 of the vehicle 10 along the side walls 16 proximate to the top rail 22 to illuminate the cargo area 26 when a tonneau cover is in use. The user first moves the plug 50 from the first condition, wherein the plug 50 is inserted into the aperture 42 defined by the D-pillar 24 of the vehicle 10, as illustrated in FIG. 2, to the second condition, wherein the access to the aperture 42 defined by the D-pillar 24 is provided, as illustrated in FIG. 5. As the plug 50 is moved to the second condition, the first and second electrical connectors 52A, 52B, which are coupled to a rear side of the plug 50 in the attached condition, move with the plug 50 through the aperture 42 and into the cargo area 26, such that the first and second electrical connectors 52A, 52B are revealed to the user, as illustrated in FIG. 5.

Next, the user moves the first and second electrical connectors 52A, 52B from the attached condition, wherein the first and second electrical connectors 52A, 52B are attached to the plug 50, to the detached condition, wherein the first and second electrical connectors 52A, 52B are detached from the plug 50. After the first and second electrical connectors 52A, 52B are detached from the plug 50, the user couples the first and second electrical connectors 52A, 52B together, such that the first and second electrical connectors 52A, 52B are operably engaged with each other, as illustrated in FIG. 7.

Next, the user snakes an elongated member (e.g., fish tape) through the gap between the upper end 62 of the D-pillar 24 and the top rail 22, through the open upper end 62 of the D-pillar 24, into the hollow 44 defined by the interior surface 46 of the D-pillar 24, and out of the aperture 42 defined by the D-pillar 24. The user then couples the terminal ends 60 of the power and ground wires 58, 56 coupled to the second electrical connector 52B to the portion of the elongated member extending through aperture 42.

Next, the user pulls the elongated member and the attached power and ground wires 58, 56 back through the gap defined between the upper end 62 of the D-pillar 24 and the top rail 22, such that the power and ground wires 58, 56 extend through the gap and into the cargo area 26, as illustrated in FIG. 8. This movement of the ground and power wires 56, 58 causes the first and second electrical connectors 52A, 52B to move back through the aperture 42 and into the hollow 44 defined by the D-pillar 24, such that the user may move the plug 50 from the second condition back to the first condition to cover the aperture 42.

With the terminal ends 60 of the power and ground wires 58, 56 situated proximate to the top rail 22 along the side wall 16, the user is able to splice the power and ground wires 58, 56 with corresponding wires of the auxiliary lighting device in a manner that generally conceals the bulk of the power and ground wires 58, 56 that extend outward from the second electrical connector 52B.

Referring now to FIGS. 9-11, in some embodiments, the D-pillar 24 may define a plurality of apertures 42. For example, the D-pillar 24 may define a first aperture 42A and a second aperture 42B. The first aperture 42A may be configured to be covered by the cover 48 in the first condition of the cover 48. In some embodiments, the second aperture 42B may be aligned in a vehicle-horizontal direction with the first aperture 42A defined by the D-pillar 24. For example, as illustrated in FIG. 11, at least portions of the first and second apertures 42A, 42B are about the same vehicle-vertical distance from the floor 20 of the cargo bed 14. In some embodiments, the second aperture 42B may be nearer than the first aperture 42A to the body 30 of the storage locker 28. In various embodiments, the first and second apertures 42A, 42B may be defined by different sides of the D-pillar 24. For example, the second aperture 42B may be generally concealed from the cargo area 26 of the vehicle 10 and defined by a side of the D-pillar 24 that faces toward the body 30 of the storage locker 28, and the first aperture 42A may be defined by a side of the D-pillar 24 that faces and/or is exposed to the cargo area 26 of the vehicle 10.

Referring still to FIGS. 9-11, the storage locker 28 may include an access indicator 64. In various embodiments, the body 30 includes the access indicator 64. The access indicator 64 may be configured to indicate to the user at least one of (1) the presence of an existing access point 66 that is in a spaced relationship with the opening 38 defined by the body 30 and configured to allow the electrical connector 52 and/or power and ground wires 58, 56 to extend into the storage space 36 defined by the body 30, and (2) a designated potential access portion of the body 30 that may be generally permanently removed from the body 30 to provide an access point 66 that is in a spaced relationship with the opening 38 defined by the body 30 and configured to allow the electrical connector 52 and/or power and ground wires 58, 56 to extend into the storage space 36 defined by the body 30. In various embodiments, the access indicator 64 is in a spaced relationship with the opening 38.

In embodiments wherein the access indicator 64 is configured to indicate the presence of an existing access point 66 that is in a spaced relationship with the opening 38 defined by the body 30, a variety of types of access indicators 64 are contemplated. For example, in some embodiments, the access indicator 64 may be a cover feature that is operable to selectively cover the access point 66 (e.g., removable plug, pivoting door, etc.). In some embodiments, the access indicator 64 may be removably coupled with the body 30, wherein removal of the access indicator 64 reveals the access point 66 defined by the body 30.

In embodiments wherein the access indicator 64 is configured to indicate the designated potential access portion of the body 30 that may be removed from the body 30 to provide an access point 66 that is in a spaced relationship with the opening 38, a variety of types of access indicators 64 are contemplated. In various embodiments, the access indicator 64 may be integrally coupled with the body 30. In some embodiments, the access indicator 64 may be positioned on the exterior side 34 of the body 30. In some examples, the access indicator 64 may protrude outward from the exterior side 34 of the body 30. For example, as illustrated in FIG. 10, the access indicator 64 is a stadium-shaped protrusion 68 that extends outward from the exterior side 34 of the body 30 of the storage locker 28. The protrusion 68 is configured to outline the portion of the body 30 that, though integrally coupled with the adjacent portions of the body 30, may be removed (e.g., via a drill) to create the access point 66. In some embodiments, the storage locker 28 may be operable to be removed from and returned to a use position that is illustrated in FIGS. 9 and 11. In some embodiments, removal of the storage locker 28 from the use position may allow the user to create the access point 66, as described further herein.

Referring now to FIGS. 10 and 11, in some embodiments, the access indicator 64 and/or the access point 66 of the storage locker 28 may be aligned in a vehicle-horizontal direction with the first and/or the second apertures 42A, 42B defined by the D-pillar 24. For example, as illustrated in FIG. 11, at least portions of the first aperture 42A, second aperture 42B, access point 66, and access indicator 64 are about the same vehicle-vertical distance from the floor 20 of the cargo bed 14. The alignment of the first aperture 42A, second aperture 42B, access point 66, and/or access indicator 64 may provide convenient and intuitive guidance to the user that desires to connect an electrical device within the storage space 36 defined by the body 30 with the electrical connector 52, as described further herein.

Referring now to FIGS. 9-11, in operation of an exemplary embodiment of the vehicle 10, a user desires to provide power from the vehicle 10 to an auxiliary electrical device disposed within the storage space 36 defined by the body 30 of the storage locker 28. First, the user removes the storage locker 28 from the use position. Removing the storage locker 28 from the use position reveals the access indicator 64 on the exterior side 34 of the body 30 of the storage locker 28. The user drills the access point 66 through the portion of the body 30 that is outlined by the access indicator 64. Subsequently, the user returns the storage locker 28 to the use position. Next, the user removes the plug 50 from the first aperture 42A defined by the D-pillar 24, which reveals the electrical connector 52. The user threads the electrical connector 52 through the second aperture 42B defined by the D-pillar 24 and the access point 66 of the storage locker 28, which is adjacent to the second aperture 42B in the use position of the storage locker 28. Finally, the user connects the electrical connector 52 to the electrical device within the storage locker 28.

The vehicle 10 disclosed herein provides a variety of advantages. First, alignment of the first aperture 42A, second aperture 42B, access indicator 64, and/or access point 66 provides an intuitive and convenient means for the user to connect the electrical connector 52 with an electrical device within the storage space 36 of the storage locker 28. Second, the electrical connector 52 being removably coupled to the plug 50 that covers the aperture 42 defined by the D-pillar 24 provides a secure storage space 36 for the electrical connector 52 while the electrical connector 52 is not in use, and a convenient location for connection of electrical devices when the electrical connector 52 is in use. Third, the vehicle 10 having first and second electrical connectors 52A, 52B that are configured to be engaged with each other may result in more freedom with respect to what position an electrical device can be connected to power due to the increase in length the second electrical connector 52B provides. Fourth, the second electrical connector 52B including power and ground wires 58, 56 that extend therefrom and terminate at terminal ends 60, as illustrated in FIGS. 5 and 8, may advantageously allow the power and ground wires 58, 56 to extend through the gap defined between the upper end 62 of the D-pillar 24 and the top rail 22 of the cargo bed 14. Further, the power and ground wires 58, 56 terminating at the terminal ends 60, rather than connecting to a third electrical connector 52C directly, may negate electrical connector 52 incompatibility by allowing the power and ground wires 58, 56 to be spliced together with wires of a variety of electrical devices that may originally include a variety of types of electrical connectors 52. Fifth, the vehicle 10 including the second electrical connector 52B with the loose power and ground wires 58, 56 in addition to the first electrical connector 52A may eliminate the need for the user to remove the power and ground wires 58, 56 from the first electrical connector 52A due to connector incompatibility. Thus, the user will have the option to connect the first electrical connector 52A with electrical connectors of compatible electrical devices and splice the power and ground wires 58, 56 of the second electrical connector 52B with the wires of an electrical device that does not include a compatible electrical connector.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
a panel that defines an aperture, wherein the panel is at least a portion of a D-pillar of a cargo bed of the vehicle;
a cover operably coupled to the panel and operable between a first condition, wherein the cover conceals the aperture at a vehicle-laterally inboard side of the panel, and a second condition, wherein access to the aperture is provided; and
a first electrical connector coupled to the cover, such that the first electrical connector moves with the cover as the cover moves between the first and second conditions, and movement of the cover from the first condition to the second condition reveals the first electrical connector.

2. The vehicle of claim 1, wherein the first electrical connector is electrically coupled to a battery of the vehicle.

3. The vehicle of claim 2, further comprising:
a second electrical connector coupled to the cover, such that the second electrical connector moves with the cover as the cover moves between the first and second conditions, and movement of the cover from the first condition to the second condition reveals the second electrical connector.

4. The vehicle of claim 3, wherein the second electrical connector is not electrically connected to the battery of the vehicle.

5. The vehicle of claim 3, wherein the first electrical connector is configured for mating engagement with the second electrical connector.

6. The vehicle of claim 1, further comprising:
a storage locker positioned proximate to the D-pillar and having a body that includes an interior side that defines a storage space and an exterior side opposite the interior side, wherein the storage space is accessible via an opening defined by the body, and wherein the body includes an access indicator in a spaced relationship with the opening.

7. The vehicle of claim 6, wherein the access indicator is positioned on the exterior side of the body.

8. The vehicle of claim 7, wherein the access indicator is disposed at a position of the body, such that the access indicator is aligned in a vehicle-horizontal direction with the aperture defined by the D-pillar.

9. The vehicle of claim 6, wherein the access indicator is integrally coupled with the body.

10. The vehicle of claim 6, wherein the access indicator is removably coupled with the body, and wherein removal of the access indicator from the body reveals an access point defined by the body.

11. The vehicle of claim 1, wherein the first electrical connector is a 12-volt electrical connector.

12. A vehicle, comprising:
a cargo bed having a pillar that defines an aperture, wherein the cargo bed defines a cargo area;
a cover operably coupled to the pillar and operable between a first condition, wherein the cover conceals the aperture, and a second condition, wherein access to the aperture is provided;
a first electrical connector proximate to the pillar, such that movement of the cover from the first condition to the second condition reveals the first electrical connector; and
a storage locker positioned proximate to the pillar and having a body that includes an interior side that defines a storage space and an exterior side opposite the interior side, wherein the storage space is accessible via an opening defined by the body, and wherein the body includes an access indicator in a spaced relationship with the opening.

13. The vehicle of claim 12, wherein the access indicator protrudes outward from the exterior side of the body.

14. The vehicle of claim 12, wherein the access indicator is disposed at a position of the body, such that the access indicator is aligned in a vehicle-horizontal direction with the aperture defined by the pillar.

15. The vehicle of claim 12, wherein the opening defined by the body faces the cargo area defined by the cargo bed.

16. The vehicle of claim 12, wherein the first electrical connector is coupled to the cover, such that the first electrical connector moves with the cover as the cover moves between the first and second conditions.

17. The vehicle of claim 16, further comprising:
a second electrical connector coupled to the cover, such that the second electrical connector moves with the cover as the cover moves between the first and second conditions, and movement of the cover from the first condition to the second condition reveals the second electrical connector.

18. The vehicle of claim 17, wherein the first electrical connector is configured for mating engagement with the second electrical connector.

19. A vehicle, comprising:
a panel defining an aperture;
a cover operably coupled to the panel and operable between a first condition, wherein the cover conceals the aperture at a vehicle-laterally inboard side of the panel, and a second condition, wherein access to the aperture is provided; and
an electrical connector that is operable between an attached position, wherein the electrical connector is coupled to the cover, such that the electrical connector is operable to move with the cover as the cover moves between a first condition, wherein the cover conceals the aperture, and a second condition, wherein access to the aperture is provided, and a detached position, wherein the electrical connector is not coupled to the cover, the electrical connector being electrically connected to a battery of the vehicle in both the attached and detached positions.

20. The vehicle of claim 19, wherein the electrical connector is a first electrical connector, and a second electrical connector is configured to selectively couple to the first electrical connector when the first electrical connector is in the detached position.

* * * * *